United States Patent
Ivaturi et al.

[11] Patent Number: 6,134,690
[45] Date of Patent: Oct. 17, 2000

[54] COMPUTERIZED AUTOMATION SYSTEM AND METHOD

[75] Inventors: Devi Prasad Ivaturi, Mountain View; Kushal A. Patel, Sunnyvale, both of Calif.

[73] Assignee: Cisco Technology, Inc., San Jose, Calif.

[21] Appl. No.: 09/104,922

[22] Filed: Jun. 25, 1998

[51] Int. Cl.[7] .................................................. G01R 31/28
[52] U.S. Cl. ............................................. 714/736; 714/46
[58] Field of Search ........................... 714/736, 46, 719, 714/724, 32, 43; 709/101, 102, 212, 213, 216

[56] References Cited

U.S. PATENT DOCUMENTS

| | | | |
|---|---|---|---|
| 4,701,845 | 10/1987 | Andreasen et al. | 714/31 |
| 4,937,827 | 6/1990 | Beck et al. | 714/33 |
| 5,097,469 | 3/1992 | Douglas | 714/712 |
| 5,179,695 | 1/1993 | Derr et al. | 714/31 |
| 5,247,517 | 9/1993 | Ross et al. | 370/452 |
| 5,317,757 | 5/1994 | Medicke et al. | 712/229 |
| 5,389,838 | 2/1995 | Orengo | 326/93 |
| 5,414,833 | 5/1995 | Hershey et al. | 713/201 |
| 5,544,077 | 8/1996 | Hershey | 702/58 |
| 5,548,775 | 8/1996 | Hershey | 711/109 |
| 5,596,715 | 1/1997 | Klein et al. | 714/43 |
| 5,600,658 | 2/1997 | Qureshi | 708/530 |
| 5,659,555 | 8/1997 | Lee et al. | 714/738 |
| 5,684,945 | 11/1997 | Chen et al. | 714/20 |
| 6,014,758 | 1/2000 | Poisner | 714/36 |
| 6,055,661 | 4/2000 | Luk | 714/736 |
| 6,065,145 | 5/2000 | Bencivenga | 714/724 |
| 6,073,262 | 6/2000 | Larkin et al. | 714/736 |
| 6,073,264 | 6/2000 | Nelson et al. | 714/738 |

*Primary Examiner*—Albert De Cady
*Assistant Examiner*—Guy Lamarre
*Attorney, Agent, or Firm*—Cesari and McKenna

[57] ABSTRACT

Computerized system and method are provided which have particular utility in the field of automated testing. In one embodiment of the method of the present invention, an array is stored in computer-readable memory. The array has a plurality of tuples, each of which includes a respective action field, a respective expected result field, a respective success field, and a respective failure field. The respective action field is for specifying at least one respective action whose performance by the system-under-test is to be commanded. The respective reaction field is for specifying at least one respective expected result to be achieved by performance of the respective action. The respective success and failures fields are for specifying further appropriate actions to be executed if the respective expected result is achieved (i.e., if a success condition occurs), or if the respective expected result is not achieved (i.e., if a failure condition occurs). A processor generates a command to the system-under-test to perform the action specified by the action field of a beginning tuple. The processor then receives an indication of an actual result of execution of the command by system-under-test, and compares this actual result to the expected result specified in the reaction field of the beginning tuple in order to determine whether a success or failure condition has occurred. Based upon whether a success or failure condition is determined by the processor to have occurred, the further action specified in the success or failure fields is executed.

17 Claims, 8 Drawing Sheets

| INDEX | ACTION | EXPECTED REACTION | ATTEMPTS | SLEEP-TIME | SUCCESS | FAILURE | UNDO |
|---|---|---|---|---|---|---|---|
| 1 | INFO EXIST ENV (AUTOTEST) | 1 | 1 | 0 | 2 | EXIT | 0 |
| 2 | SOURCE | 1 | 1 | 0 | 3 | 3 | 0 |
| 3 | SET RTR_PASSWD LAB | 1 | 1 | 0 | 4 | 4 | 0 |
| 4 | ENABLE PW $ RTR_PASSWD | 1 | 1 | 0 | 5 | 5 | 0 |
| 5 | LOG_USER 0 | 1 | 1 | 0 | 6 | 6 | 0 |
| 6 | SET TESTNAME ...$TESTNAME | 1 | 1 | 0 | 7 | 7 | 0 |
| 7 | TEST_PARSE_ARGS {...} | 1 | 1 | 0 | 8 | 8 | 0 |
| 8 | $ES1 CONFIG "... NO SHUT" | *PROTOCOL IS UP.* | 10 | 6 | 9 | 15 | 1 |
| 9 | $UUT CONFIG "... NO SHUT" | *PROTOCOL IS UP.* | 10 | 6 | 10 | 15 | 1 |
| 10 | $UUT CONFIG "... NO SHUT" | *PROTOCOL IS UP.* | 10 | 6 | 11 | 15 | 1 |
| 11 | $ES2 CONFIG "... NO SHUT" | *PROTOCOL IS UP.* | 10 | 6 | 12 | 15 | 1 |
| 12 | $ES1 EXEC "PING..." | "SUCCESS" | 10 | 6 | 13 | 15 | 0 |
| 13 | $ES2 EXEC "PING..." | "SUCCESS" | 10 | 6 | 14 | 15 | 0 |
| 14 | UN-CONFIG | NULL | 1 | 0 | TRUE | NULL | 0 |
| 15 | UN-CONFIG | NULL | 1 | 0 | FALSE | NULL | 0 |

*FIG. 6*

```
SET MATRIX {
# INITIALIZATION PHASE
1 : INFO EXISTS ENV (AUTOTEST) : 1 : 1 : 0 : 2 : EXIT : 0
2 : SOURCE : 1 : 1 : 0 : 3 : 3 : 0
3 : SET RTR_PASSWD LAB : 1 : 1 : 0 : 4 : 4 : 0
4 : ENABLEPW $RTR_PASSWD : 1 : 1 : 0 : 5 : 5 : 0
5 : LOG_USER 0 : 1 : 1 : 0 : 6 : 6 : 0
6 : SET TESTNAME [SHIFT ARGV]; TEST_NAME $TESTNAME : 1 : 1 : 0 : 7 : 7 : 0
7 : TEST_PARSE_ARGS {ES1 ES1UUTINT UUTES1INT UUT UUTES2INT ES2UUTINT ES2} : 1 : 1 : 0 : 8 : 8 : 0
# CONFIG PHASE
8 : $ES1 CONFIG "INTERFACE $ES1UUTINT; NO SHUT" : "PROTOCOL IS UP.*" : 10 : 06 : 9 : 15 : 1
9 : $UUT CONFIG "INTERFACE $UUTES1INT; NO SHUT" : "PROTOCOL IS UP.*" : 10 : 06 : 10 : 15 : 1
10 : $UUT CONFIG "INTERFACE $UUTES2INT; NO SHUT" : "PROTOCOL IS UP.*" : 10 : 06 : 11 : 15 : 1
11 : $ES2 CONFIG "INTERFACE $ES2UUTINT; NO SHUT" : "PROTOCOL IS UP.*" : 10 : 06 : 12 : 15 : 1
# ANALYSIS PHASE
12 : $ES1 EXEC "PING $IP ($ES2, $ES2UUTINT)" : "SUCCESS" : 10 : 06 : 13 : 15 : 0
13 : $ES2 EXEC "PING $IP ($ES1, $ES1UUTINT)" : "SUCCESS" : 10 : 06 : 14 : 15 : 0
# UNCONFIG PHASE
14 : UN-CONFIG : NULL : 1 : 0 : TRUE : NULL : 0
15 : UN-CONFIG : NULL : 1 : 0 : FALSE : NULL : 0
}
```

FIG. 7

COMPUTERIZED AUTOMATION SYSTEM AND METHOD

BACKGROUND OF THE INVENTION

1. Field of the Invention

The present invention relates generally to a computerized automation system and method, and more specifically, to a computerized automation system and method which utilize a matrix or array of vectors specifying actions to be performed and expected results of those actions, whereby to permit comparison between the expected and actual results of these actions. Although particular utility for the present invention is found in the field of computer network test automation, and the present invention will be described herein in connection with such utility, as will be appreciated by those skilled in the art, other utilities are also contemplated for the present invention, including other automated programming applications.

2. Brief Description of Related Prior Art

Many automated systems/procedures currently exist for stimulus/response testing of various units-under-test (UUT), such as printed circuit boards, computer networks, and other electronic systems and devices. Examples of such systems include those devoted to boundary-scan, bed of nails, built-in self test, and other techniques. In general, such testing involves supplying test input stimuli (e.g., commands, data, etc.) to the UUT, observing actual outputs (e.g., actions, data, etc.) generated by the UUT in response to the stimuli, and comparing the actual outputs to outputs that are expected if the UUT is functioning properly. Depending upon the degree to which the actual outputs match those that are expected, the testing system will indicate either that the UUT has passed the test (i.e., is functioning properly), or has failed the test (i.e., is not functioning properly).

For purposes of illustration, testing of a computer network routing system using one such conventional stimulus/response testing technique will now be described. In this exemplary arrangement, the system-under-test (SUT) consists of a router which is part of an overall computer network system wherein the router is coupled to a first computer endstation via a first network (e.g., a token ring network) and is also coupled to a second computer endstation via a second network (e.g., a serial type of network connection). Each of the endstations and router may comprise conventional network/computer hardware and software appropriate for permitting communication between the two endstations via the first and second networks and the router. A testing process running on one of the endstations (or, e.g., on a dedicated testing computer coupled to and controlling one or both of the endstations and router via another a third network) initializes the network system for stimulus/response testing (e.g., by initializing test program code/script variables, loading source library functions and variables, binding actual ports/device identifiers supplied via e.g., arguments, into the variables used for same in the program code/script, etc.). Thereafter, the testing process configures the network system (e.g., by getting components' interface addresses, opening the interfaces along the testing path between the testing station and the other endstation, verifying that the interfaces have been properly set up, etc.) so as to permit testing of the SUT and/or specific feature thereof desired to be tested. The testing process then actually begins stimulus/response testing of the SUT by supplying predetermined commands/data to the SUT for causing same to carry out predetermined actions which result in generation of outputs which the process then observes and/or receives as inputs, respectively. For example, in this exemplary prior art arrangement, the testing process may issue commands (e.g., "ping" commands), via the router, for causing the other endstation to transmit data, IP address information, etc. to the testing endstation via the router, and verify that the requested data and/or information has been properly received from the other endstation by comparing these received outputs from the SUT to predetermined, expected outputs therefor, and based upon this comparison, determine whether the SUT is or is not functioning properly. The testing process may also issue commands to the other endstation, via yet another network whose operation is known to be good, for causing the other endstation to undertake stimulus/response testing of the SUT by requesting, via the router, that the endstation that issued the commands transmit data, IP address information, etc. to the other endstation, and determine based upon the received data and/or information whether the SUT is functioning properly. After the testing is completed, the testing process may then close the interfaces previously opened.

Heretofore, in order to carry out a stimulus/response test of a network SUT using the aforesaid type of conventional testing arrangement, an extensive amount of complex test script/program code has had to be written, debugged, and compiled for each such test or series of tests, in order to generate the testing process. As can be readily appreciated, this process places a significant burden upon test programmers in terms of coding time, effort, and frustration. Often, much of the code generated for a specific test (i.e., a test of specific network equipment and/or features) will be substantially identical/generic to code segments that would be necessary to implement many stimulus/response tests (e.g., configuration procedures, input/output comparison test loops, etc.). This leads to much duplication of programming effort, wasted time, and opportunity for introduction of coding errors. Further, use of function libraries and other predefined libraries of commonly used instructions and data have been unable to ameliorate this problem to an extent that would be desirable.

Also, as is the case with much of the program code that is application specific (i.e., written for a specific task and not intended/expected to be reused), large amounts of the testing code being written will lack a significant degree of modularity. This makes editing, debugging and reuse of such code difficult.

SUMMARY OF THE INVENTION

Accordingly, in one embodiment of the method of the present invention, an array is stored in a computerized automation system's memory. The array includes a plurality of respective tuples. Each of the tuples includes respective action, reaction, success, and failure fields. Each action field specifies at least one respective action that the automation system is to command another system (e.g., the SUT) to perform. Each reaction field specifies at least one result (e.g., signal output, returned data value, etc.) expected to be achieved by performance of the action specified in the action field of the tuple in which the reaction field is located. Each success field specifies further action to be executed by the automation system if the expected result specified in the reaction field of the tuple in which the success field is located, is achieved. Each failure field specifies other action to be executed by the automation system if the expected result specified in the reaction field of the tuple in which the failure field is located, is not achieved.

A processor in the automation system executes a computer process which accesses the matrix and generates a command to the other system to perform the action specified in the action field of a beginning tuple of the array (e.g., the first tuple). The processor then receives from the other system an indication of an actual result of execution of the command by the other system, and compares this actual result to the expected result specified in the reaction field of the beginning tuple. Based upon this comparison, the processor determines whether the expected result specified in the reaction field of the beginning tuple has been achieved by the other system's execution of the processor's command. The processor then commands the automation system to execute the further action specified in the success field of the beginning tuple if the expected result specified in said reaction field of the beginning tuple has been achieved, otherwise (i.e., if the expected result specified in the reaction field of the beginning tuple has not been achieved) the processor commands the automation system to execute the other action specified in the failure field of said beginning tuple.

The further action may be specified in the success field in the form of a reference to the index number of another tuple of the array, a predefined function/operating system call stored in memory, or by expressly listing one or more commands to be executed by the processor. In the case in which the further action is specified by a tuple index number reference, the processor may be configured to command execution of the action specified in the action field of the tuple having the referenced index number, and to compare the actual result of said command with the expected result specified in that tuple; thereafter, the processor may be configured to follow the foregoing procedure described above in connection with the beginning tuple, but this time utilizing the tuple elements of the referenced index number. Likewise, the above process may then be repeated if the success field of the tuple having the referenced index number itself also references another tuple index number. This process may be used in a similar fashion, if actual and expected results of a given command do not conform, with the tuple's failure field.

Also according to this embodiment, a user interface may be provided for permitting user input of the data/instructions contained in the fields of the array. The interface may include a display for echoing the user's input and may be configured to receive the input by entry of, for each of the respective tuples of the array being input, a respective index number of the respective tuple being input followed by respective values for each of the fields of that tuple being input, with each of these user entries being separated from each other by respective delimiting characters. The actions may be specified in the action fields by either compound statements, or via calls to operating system and/or other predefined functions stored in the memory.

Additionally, each tuple may also include another field that is accessed by the processor. This other field may specify a number of times that the processor is to repeat a given command's generation until the expected result associated with that command is received by the processor. Each tuple may also include yet another field for specifying a period of time that the processor is to wait between any two repetitive command generations.

Thus, in broad concept, the present invention utilizes predefined, generic procedure which accesses specific test data and instructions stored in a test vector matrix to, in effect, transform the generic procedure into one that is suitable for carrying out the specific test of the SUT based upon the accessed test data and instructions. Advantageously, this greatly automates generation of test code and eliminates much of the redundant test code that otherwise would have to be written, compiled, and debugged. Further advantageously, entry of the specific test data and instructions into well-defined matrix fields greatly enhances modularity, and thereby, also makes it easier to edit, debug, and reuse portions of specific test data and instructions. Indeed, modification of the testing procedure according to the present invention can be as simple as adding, deleting, and/or editing individual rows or entries in the matrix! Thus, as will be appreciated by those skilled in the art, the present invention is able to significantly reduce the burden placed upon test programmers in terms of coding time, effort, and frustration.

These and other features and advantages of the present invention will become apparent as the following Detailed Description proceeds, and upon reference to the Drawings, wherein like numerals depict like parts, and in which:

BRIEF DESCRIPTION OF THE DRAWINGS

FIG. 6 is a diagrammatic representation using code and pseudocode statements of the contents and structure of the matrix array stored in the memory shown in FIG. 5.

FIG. 7 illustrates code/pseudocode statements by which the various contents of the matrix of FIG. 6 may be entered to the memory of FIG. 5 via use of the user interface of the testing endstation of FIG. 2.

Figure 1:
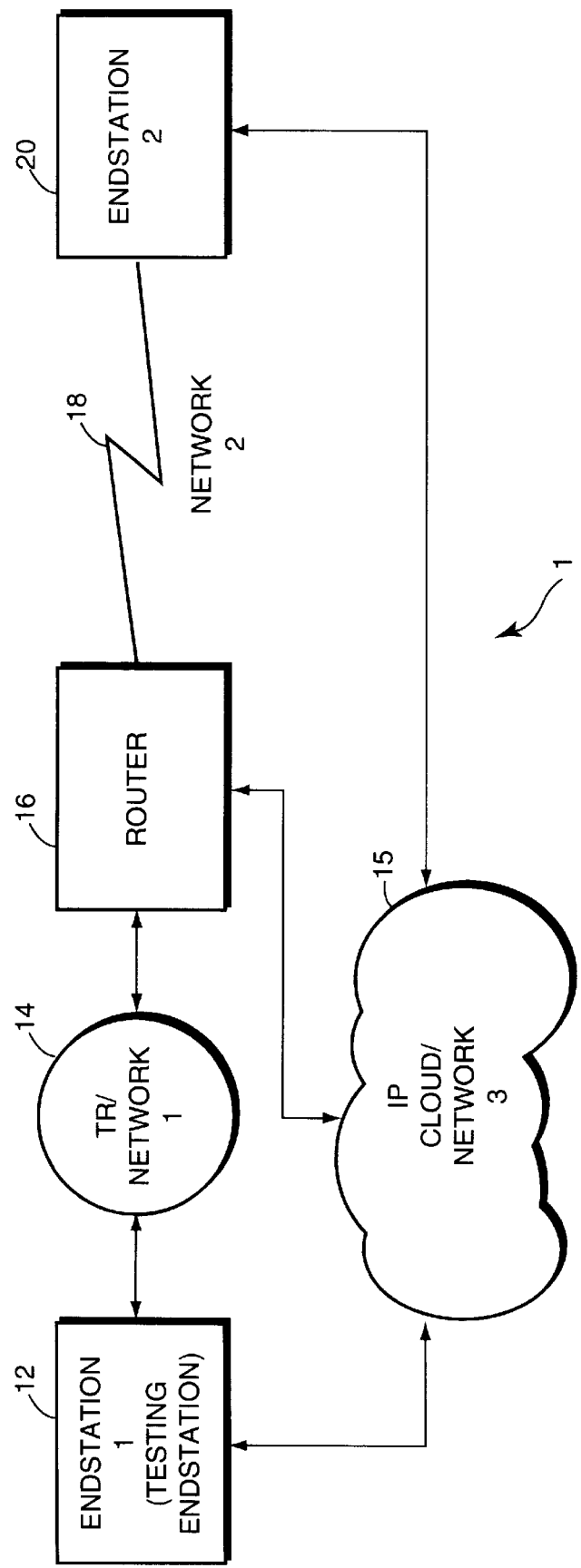
FIG. 1 is a highly schematic functional block diagram of a testing arrangement which utilizes one embodiment of the system of the present invention.
Figure 2:
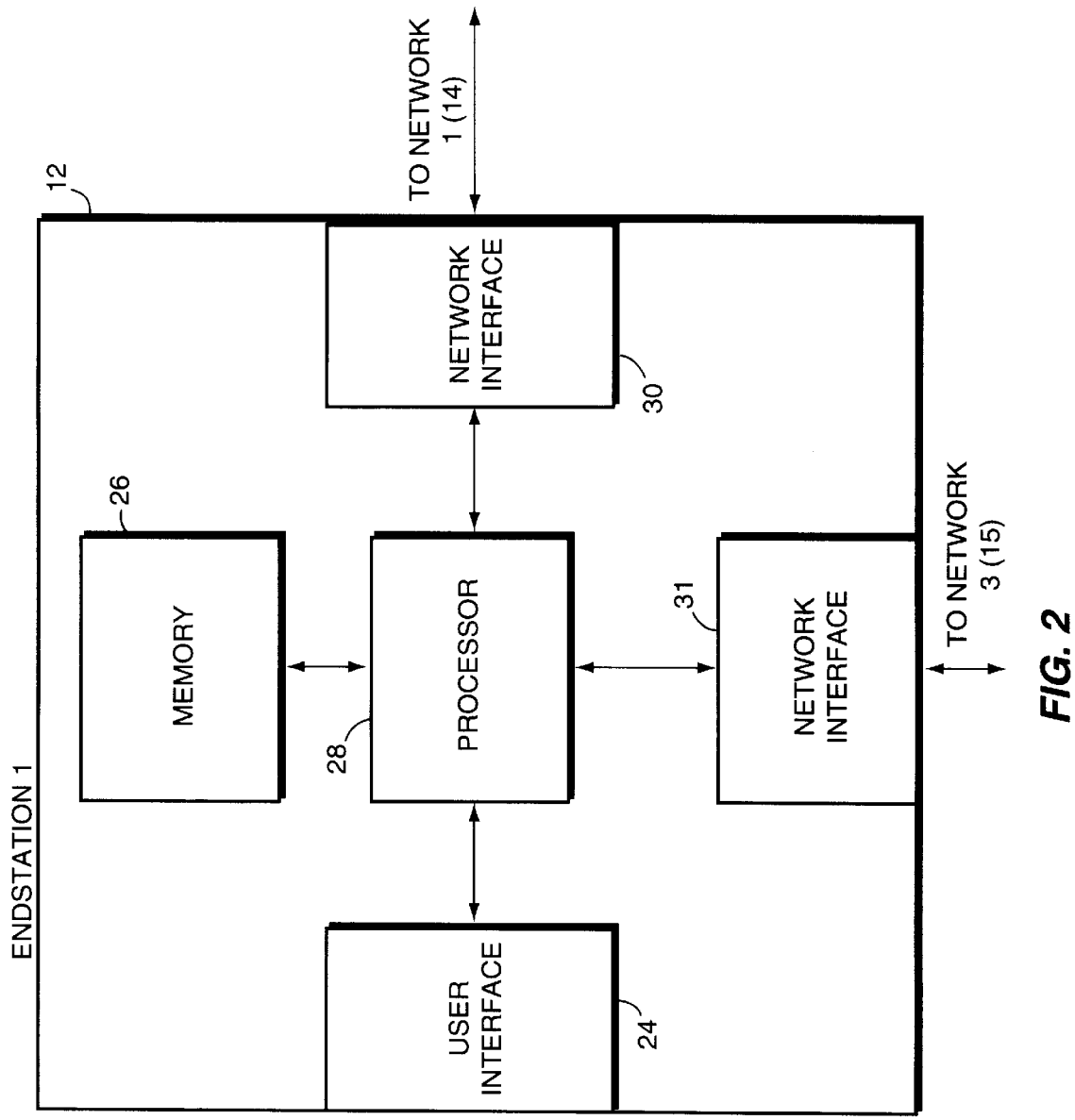
FIG. 2 is a highly schematic block diagram of one of the two endstations in the arrangement of FIG. 1.
Figure 3:
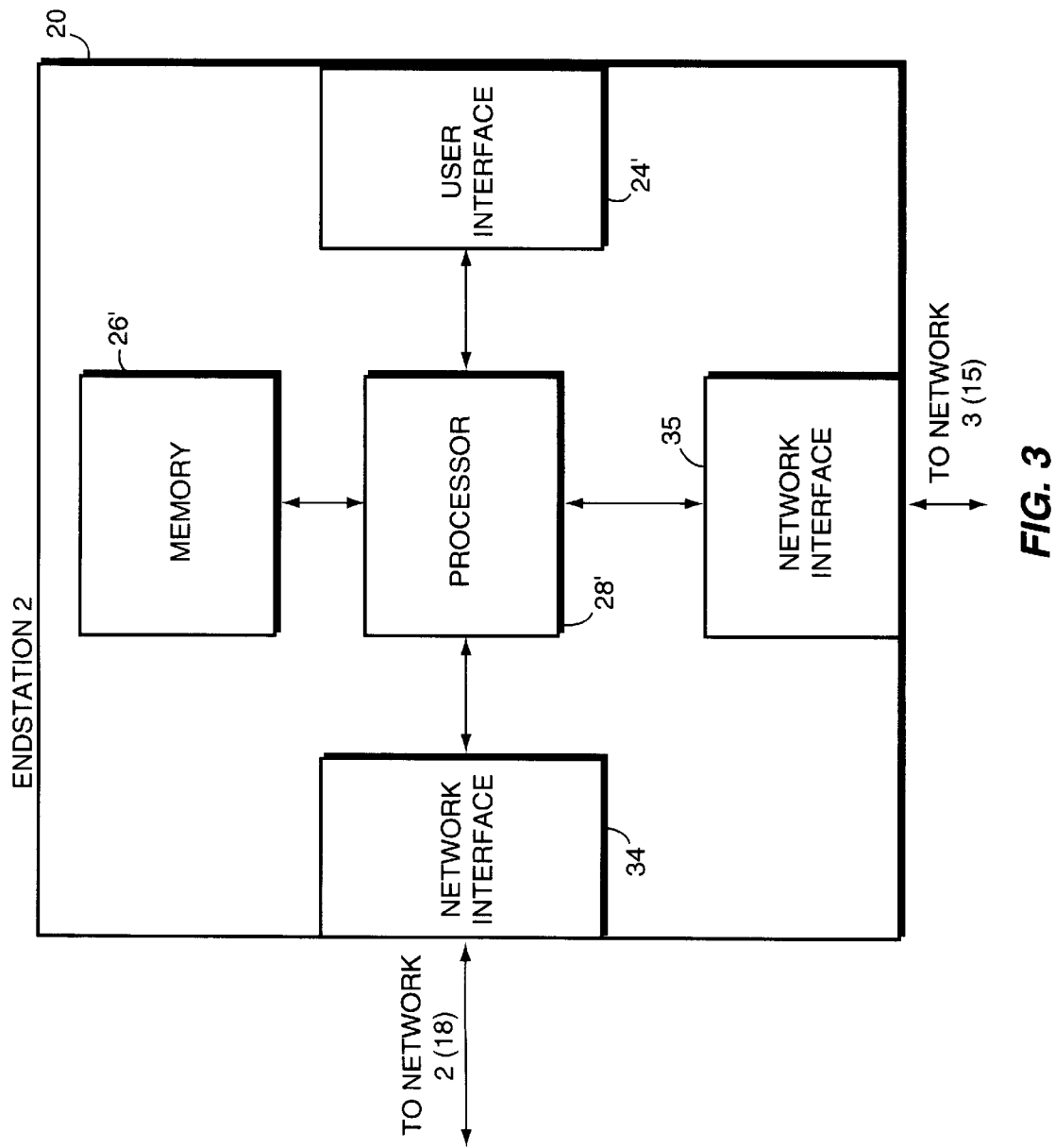
FIG. 3 is a highly schematic block diagram of the other of the two endstation in the arrangement of FIG. 1.
Figure 4:
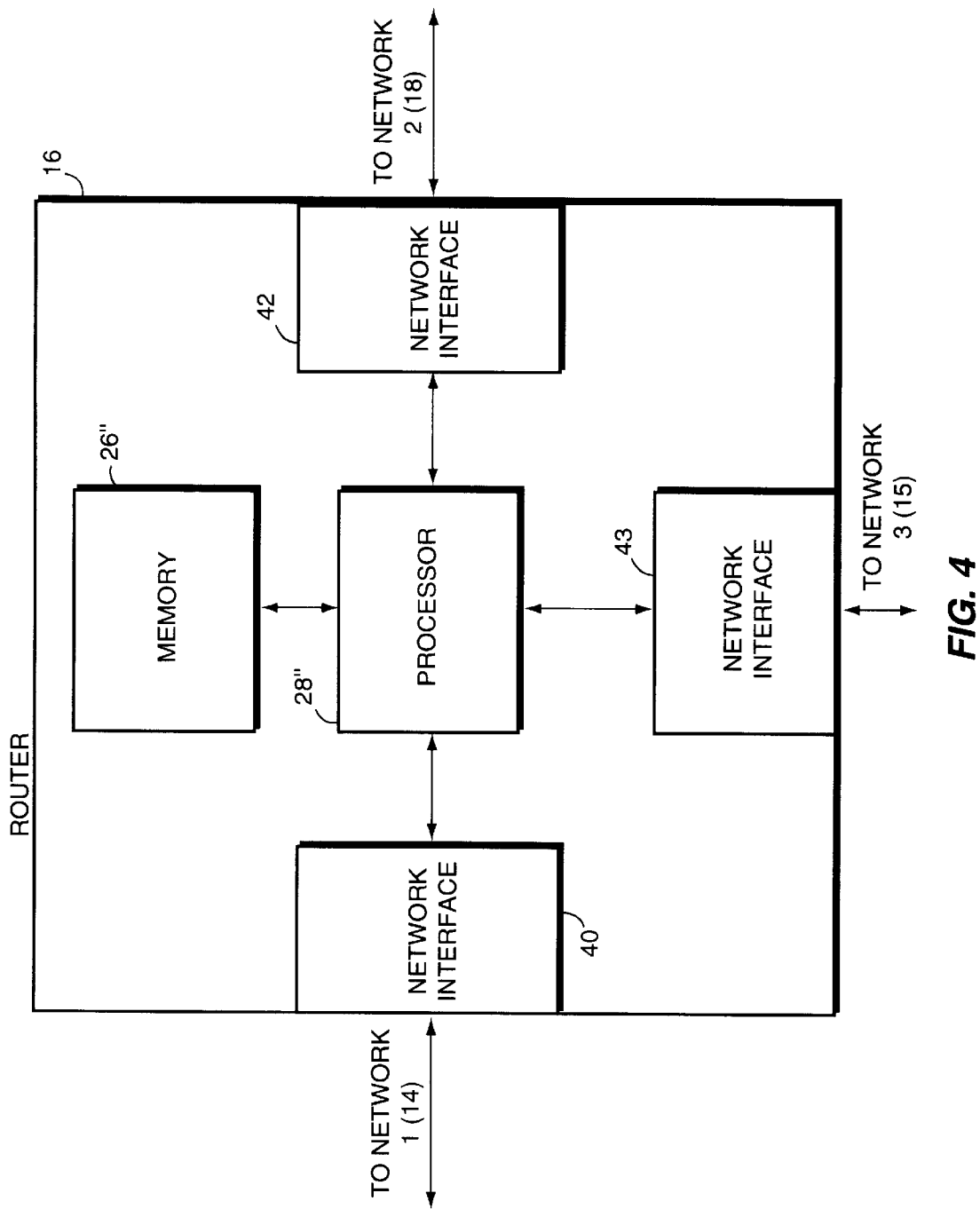
FIG. 4 is a highly schematic block diagram of the router SUT of the arrangement of FIG. 1.

As will be appreciated by those skilled in the art, although the following Detailed Description will proceed with reference being made to specific embodiments and methods of use, the present invention is not intended to be limited to these embodiment and methods of use. Rather, the present invention is intended to be viewed broadly as encompassing all alternatives, modifications, and variations from these embodiments and methods of use as are included within the spirit and broad scope of the hereinafter appended claims.

DETAILED DESCRIPTION OF AN ILLUSTRATIVE EMBODIMENT

With reference now being made to FIGS. 1–8, one illustrative embodiment of the present invention will now be described in connection with use in network testing arrangement 1. Arrangement 1 includes a first computer endstation 12 coupled by a conventional token ring network 14 to a computer router SUT 16, which SUT 16 is also coupled by a conventional serial type of network 18 to a second computer endstation 20. A third network 15 (whose performance is known by the operator of the testing arrangement 1 to be good, i.e., functioning properly, such e.g., an Internet computer network) also couples the endstations 12, 20 and router together.

Testing endstation 12 comprises a user interface 24, central processor 28, computer-readable memory 26, and network interfaces 30, 31. User interface 24 comprises conventional graphical user interface means (not shown) for permitting user input of commands and data to the processor 28, and for data transmitted from the processor 28 to be displayed in a user-appreciable form. Computer-readable memory 26 comprises conventional random access, read only, and/or mass storage memory for storing various computer programs (e.g., testing process 52 and operating system/library functions/network communications processes 54, etc.) for execution by the processor 28 and data structures (e.g., matrix array 50 of action/reaction vectors, etc.) for manipulation as a result, and/or used by the processor 28 during execution of the processes stored in memory 26. Network interface 30 is for interfacing the endstation 12 to the network 14 and is appropriately adapted to convert data, commands, and network routing information issued by the processor 28 and/or supplied from memory 26 into forms appropriate for transmission via network 14, and to convert data, commands, and network routing information from the network 14 from the forms suitable for transmission via the network 14 into those suitable for being processed by the processor 28 and stored in memory 26. Likewise, network interface 31 is for interfacing the endstation 12 to the network 15 and is appropriately adapted to convert data, commands, and network routing information issued by the processor 28 and/or supplied from memory 26 into forms appropriate for transmission via network 15, and to convert data, commands, and network routing information from the network 15 from the forms suitable for transmission via the network 15 into those suitable for being processed by the processor 28 and stored in memory 26.

Endstation 20 comprises computer-readable memory 26', user interface 24', central processor 28', and network interfaces 34, 35. User interface 24' comprises conventional graphical user interface means (not shown) for permitting user input of commands and data to the processor 28', and for data transmitted from the processor 28' to be displayed in a user-appreciable form. Memory 26' is of substantially the same construction as memory 26 in endstation 12, and is for storing various computer programs (e.g., operating system/function calls/communication processes, etc., but in arrangement 1, do not include process 52) for being executed by the processor 28' and data structures (not including matrix array 50) for being manipulated as a result, and/or used by the processor 28' during execution of the processes stored in memory 26'. Network interface 34 is for interfacing the endstation 20 to the network 18 and is appropriately adapted to convert data, commands, and network routing information issued by the processor 28' and/or supplied from memory 26' into forms appropriate for transmission via network 18, and to convert data, commands, and network routing information issued from the network 18 from the forms suitable for transmission via the network 18 into those suitable for being processed by the processor 28' and stored in memory 26'. Likewise, network interface 35 is for interfacing the endstation 20 to the network 15 and is appropriately adapted to convert data, commands, and network routing information issued by the processor 28' and/or supplied from memory 26' into forms appropriate for transmission via network 15, and to convert data, commands, and network routing information issued from the network 15 from the forms suitable for transmission via the network 15 into those suitable for being processed by the processor 28' and stored in memory 26'.

Router 16 comprises computer-readable memory 26", central processor 28", and network interfaces 40, 42, 43. Memory 26" is of substantially the same construction as memory 26 in endstation 12, and is for storing various computer programs (e.g., operating system/function calls/communication processes, etc., but in arrangement 1, do not include process 52) for being executed by the processor 28" and data structures (not including matrix array 50) for being manipulated as a result, and/or used by the processor 28" during execution of the processes stored in memory 26". Network interface 40 is for interfacing the router 16 to the network 14 and is appropriately adapted to convert data, commands, and network routing information issued by the processor 28" and/or supplied from memory 26" into forms appropriate for transmission via network 14, and to convert data, commands, and network routing information supplied from the network 14 from the form suitable for transmission via the network 14 into that suitable for being processed by the processor 28" and stored in memory 26". Similarly, network interface 42 is for interfacing the router 16 to the network 18 and is appropriately adapted to convert data, commands, and network routing information issued by the processor 28" and/or supplied from memory 26" into form appropriate for transmission via network 18, and to convert data, commands, and network routing information supplied from the network 18 from the form suitable for transmission via the network 18 into that suitable for being processed by the processor 28" and stored in memory 26". Likewise, network interface 43 is for interfacing the router 16 to the network 15 and is appropriately adapted to convert data, commands, and network routing information issued by the processor 28" and/or supplied from memory 26" into form appropriate for transmission via network 15, and to convert data, commands, and network routing information supplied from the network 15 from the form suitable for transmission via the network 18 into that suitable for being processed by the processor 28" and stored in memory 26".

Although not shown in the Figures for purposes of avoiding unnecessary complication of discussion, interfaces 30, 34, 40, and 42 are each adapted to implement a Transmission Control Protocol/Internet Protocol (TCP/IP)-based network communications protocol, utilizing multiple protocol layers appropriate for permitting the interfaces to carry out their specified functions. However, it will be appreciated by those skilled in the art that other network communication protocols, send an IPX, Appletalk, DecNet, etc. may be utilized in connection with the teachings described herein. In this testing arrangement 1, the router 16 is the SUT and it is the router's ability to route TCP/IP-based data packets between endstations 12, 20 via the networks 14, 18 that is the feature under test. Network 15 and the network interfaces associated therewith (i.e., interfaces 31, 35, and 43) are assumed for purposes of this testing to be configured correctly in order to permit the same to be used in configuring interfaces 30, 34, 40, and 42 and in other procedures associated with the testing.

In order to test this feature of the SUT router 16, the memory 26 of endstation 12 contains a generalized, automated testing process 52, and a matrix array data structure 50 containing a plurality of action/reaction test vectors 60, 62, 64, . . . 88. As will be described more fully below, in this embodiment of the present invention, process 52, when executed by the processor 28, accesses the data and program instructions contained in the matrix 50 in order to carry out stimulus/response testing of the aforesaid feature of the router 16.

More specifically, in this embodiment, in order to initiate stimulus/response testing of the router 16, a user (not shown) at testing station 12 enters appropriate commands via interface 24 to cause the processor 28 to load the process 52 and array 50 into memory 26, and begin execution of the process 52. For example, in order to initiate execution of process 52 the user may input a command line, via the interface 24, containing the program file name associated with the process 52 and appropriate arguments (e.g., the names of the endstations, router, their respective network interfaces, network topology information, etc.) to be passed to the process 52. The specific statements that may be used by the user to define and store in memory 26 the data/program instructions of matrix 50 will be described below in greater detail, in connection with FIG. 7. However, returning to the present discussion, in this embodiment of the present invention, when executed by the processor 28, the process 52 begins by setting an internal matrix index/tuple access variable (not shown), indicative of the tuple whose instructions/data are presently to be accessed by the process 52, to a value appropriate for causing the process 52 to access the first/beginning tuple 60 of the matrix (i.e., in this embodiment, a value equal to one so as to cause the process 52 to begin accessing the instructions/data contained in the tuple 60 whose index field 90 contains a value of one). In this embodiment, the action field 92 of the first tuple 60 contains the pseudocode initialization instruction "info exists env (AUTOTEST)." It should be understood that although a mixture of code and pseudocode instructions/data structures populate the action 92 and reaction 94 fields of the matrix 50, in actual implementation, the matrix 50 contains actual multi-step code segments, and data structures, in each of fields 92, 94, respectively. The instruction specified in action field 92 of the first or beginning tuple 60 is then executed by the process 52. This instruction ensures that the testing environment variable "AUTOTEST" has been set (e.g., so as to permit various predefined functions/source libraries to be accessed by the process 52), and the function upon which this instruction is based "info exists env" is comprised within the operating system calls, etc. 54 loaded in memory 26. At completion of its execution, this function returns to the process 52 a value indicative of whether the "AUTOTEST" variable has been set (i.e., "1") or not set (i.e., "0"). Process 52 then compares this actual value returned as a result of the execution of the function to the expected value contained in the expected reaction field 94 of the first tuple 60. If the two values match, the action indicated by field 92 of tuple 60 was successful (i.e., its performance resulted in generation of the expected reaction/output indicated in field 94 associated with that action); otherwise performance of the action was not successful (i.e., was a failure).

If the performance of the action was successful, the process 52 then checks to see whether the flag in undo field 104 associated with the performed action 92 in tuple 60 has been set (i.e., has a value of "1"). If the flag has not been set (as is the case in tuple 60), the process 52 then executes the further action specified in the success field 100 associated with the successfully performed action 92 of tuple 60. In tuple 60, field 100 contains the value "2," which is interpreted by the process 52 as constituting an instruction, by reference to tuple 62 having that index value 90, to execute the further actions whose instructions/data are contained in the tuple 62 whose index number 90 is being referenced.

Otherwise, if the performance of the action was not successful, the process 52 then decrements (e.g., by one) the value contained in the attempts field 96 associated with the unsuccessful action 92 of tuple 60. In this case, this value is "1" and thus the decremented value is "0." The process 52 then determines whether this decremented value is equal to zero, and if so (as is the case in tuple 60), sets the index access variable equal to he value contained in the failure field 102 associated with the failed action 92 of tuple 60, which in tuple 60 is "Exit." At this point, the process 52 then determines whether he current value of the index access variable is equal to "True," "False," or "Exit." Since, at this point, this value is equal to "Exit," the process 52 then executes this further action specified in failure field 102 (i.e., it immediately terminates) and returns indication to the user via interface 24 that testing of the arrangement 1 has failed.

Assuming that the performance of the action specified in field 92 was successful, the process 52 then continues by executing the further action(s) 92 contained in the tuple 62 whose index 90 is referenced in success field 100 associated with the successfully performed action 92 of tuple 60. In tuple 62, this further action consists of executing a predefined (e.g., by the user) procedure named "SOURCE" for loading into memory 26 various predefined testing library functions and data (e.g., previously written by the user or provided as part of the operating system, etc.) appropriate for use in testing the router 16 using arrangement 1. Upon completion of its execution, this procedure returns an indication as to whether execution was successful (i.e., the library functions and data sought to be loaded were in fact properly loaded) or not (i.e., these functions and data were not properly loaded). In this case, the procedure returns a value of "1" if execution was successful and a value of "0" if unsuccessful. This actual returned value is then compared with that expected if execution was successful, which latter value is contained in the expected reaction field 94 of tuple 62. If the two values match, the process 52 determines that the performance of the action specified in field 92 of tuple 62 was successful; otherwise, the process 52 determines that same was unsuccessful.

If the performance of the action in field 92 of tuple 62 was successful, the process checks if the undo flag 104 of tuple 62 is set. Since this flag 104 is not set in tuple 62, the process proceeds to set the value of the index access variable equal to the index value referenced in the success field 100 of the tuple 62, which in this case, is "3."

If the performance of the action in field 92 of tuple 62 was unsuccessful, the process 52 decrements by one the value contained in the attempts field 96 of tuple 62 and compares that decremented value to zero. Since in this case, the decremented value is equal to zero, the process 52 then sets the index access variable equal to the value contained in the failure field 102 of tuple 62, which latter value is "3." Thus, regardless of whether the performance of the action specified in field 92 was successful or not, the further action executed by the process 52, after execution of the action specified in field 92 of tuple 62, is that specified in field 92 of tuple 64.

The foregoing procedure used to process the instructions/data of tuple 62 is then repeated using the instructions/data values contained in each of tuples 64 to 72. As can be seen from inspection of FIG. 6, the instructions/data contained in each respective tuple 64–72 (i.e., the values contained in the respective success 100 and failure 102 fields of tuples 64 to 72) cause process 52 to execute the instructions/data contained in the respective tuple having the next respectively higher index number, regardless of whether process 52 determines that performance of the action specified in that respective tuple was successful or unsuccessful. For example, in the case of tuple 64, after executing the action specified in action field 92 of tuple 64, the further action executed by the process 52 is that specified in the action field 92 of tuple 66, regardless of the whether performance of the action specified in field 92 of tuple 64 was successful or not. Similarly, after executing the action specified in action field 92 of tuple 66, the further action executed by process 52 is that specified in action field 92 of tuple 68, regardless of whether performance of the action specified in field 92 of tuple 66 was successful or not, and so forth for each of the other tuples 68 to 72. For purposes of completeness of description, it should be noted that the actions specified in the action fields 92 of tuples 64 to 72 are, respectively, for commanding the router 16 (e.g., via network 15) to set its password to the value "lab," enabling that password, disabling results of testing the router 16 (via execution of actions specified in subsequent tuples) from being logged to a file, displaying via the interface 24 the name of the program file being executed, and parsing the values of the arguments passed via the command line used to begin execution of the process 52 and binding them to the variable names associated with these values in the process 52 and matrix 50.

Next, the process 52 executes the actions specified in field 92 of tuple 74. These actions configure an IP address for the interface 30 for use in testing the IP routing feature of router 16 via network 14, open (i.e., activate) that IP address, update the IP address routing information to the router 16 (if necessary) and verify that the IP address has been configured correctly by thereafter requesting that the interface 30 supply (e.g., "show") its configured IP address to the process 52. Each of these actions is invoked, in actual implementation, via appropriate multi-step predefined functions calls (with appropriate arguments) by invocation of the names of these functions, with their arguments, stored in field 92 of tuple 74. Similar to the other predefined functions referenced in tuples 60 to 72, the functions specified in field 92 of tuple 74 return values to process 52 that are indicative of whether the functions' executions were successful or not. The values that are returned by the functions if they successfully execute are represented by ".*protocol is up.*" in field 94 of tuple 74.

If even a single one of these executions is determined to be unsuccessful, the process 52 proceeds to decrement by one the value contained in the attempts field 96 of tuple 74, and compare that decremented value to zero. In this case, since the initial value contained in the attempts field 96 of tuple 74 is ten, this comparison indicates that the decremented value (i.e., nine) does not equal zero, and in response, the process 52 again performs the actions specified in the action field 92 of the tuple 74, after waiting the amount of time specified in seconds in the sleep-time field 98 of tuple 74. The actual outputs resulting from these repeated executions of the actions specified in field 92 of tuple 74 are again compared with those expected therefor, and once again, if they do not match, the process 52 decrements the last decremented value (i.e., nine) of the attempts field 94 of tuple 74 and compares this again decremented value (i.e., eight) to zero. Since this latter decremented value does not equal zero, the process 52 again loops back, after waiting the amount of sleep time specified in field 98 of tuple 74, to perform the actions specified in the action field 92 of tuple 74. This looping procedure continues until either the actions specified in the action field 92 of tuple 74 are performed successfully or the repeatedly decremented value of the attempt field equals zero. Thus, if a success condition never occurs in relation to the action specified in field 92 of tuple 74, given the initial value of the attempts field 96 of tuple 74, the process goes through this looping procedure ten times, and thereafter, the process 52 changes the index access variable value to equal that contained in the failure field 102 of tuple 74, which value is equal to fifteen.

If a success condition does occur, the process 52 proceeds to check whether the undo flag 104 of tuple 74 has been set. In this case, flag 104 is set. This causes the process 52 to push the actions specified in the action field 92 of tuple 74 onto a stack (not shown) in memory 26 for subsequent use in unconfiguring the system 1 after testing is completed. After pushing these actions onto the stack, the process continues by setting the index access variable equal to the value contained in the success field 100 of the tuple 74, which value is in tuple 74 equal to nine.

Once the index access variable has been updated to contain either the value specified in the success or the failure fields of tuple 74, the process 52 checks whether this newly updated value equals any of the aforesaid values for indicating that the process 52 should terminate immediately. Since in this case, neither the success nor the failure fields of the tuple 74 contain such values, the process 52 continues by accessing/executing the data/instructions contained in either tuple 88 (if failure occurred the ten times specified by the attempts field 96) or tuple 76 (if a success condition occurred).

Access/execution of the data/instructions contained in tuple 88 begins by executing the "Un-config" command specified in the action field 92 of tuple 88. This command causes those actions which have previously been pushed onto the stack in the memory (i.e., those actions for which the associated undo flags were set) to be "popped" from the stack; the process 52 is configured to append to these popped actions negation commands (e.g., "no" in the Internetwork Operating System configuration commands used on router platforms sold by the Assignee of the subject application) and to execute these negated actions. This undoes the configuration implemented by the actions whose associated undo flags were set.

A null value is contained in the reaction field 94 of tuple 88. This causes the process 52 to determine that execution of the action specified in field 92 of tuple 88 was successful, regardless of its actual outcome, and (since the undo flag is not set in tuple 88) to set the index access variable equal to that contained in the success field 100 of tuple 88 (i.e., "False"). The process 52 then compares this newly set value to the aforesaid three values for indicating that the process 52 is to immediately terminate, and since the newly set value is one of these termination values, process 52 immediately terminates, and returns a value indicating that the testing of the router 16 failed.

If a success condition occurred in processing the instructions/data contained in tuple 74, the foregoing procedure used to process the instructions/data of tuple 74 is then substantially repeated using the instructions/data values contained in tuple 76. The actions specified in action field 92 of tuple 76 are directed to configuring (via appropriate commands and data issued by network 15) the IP address of router network interface 40 for use in testing the IP routing feature of router 16 via network 14, open (i.e., activate) that IP address, update the IP address routing information available to the router 16 (if necessary) and verify that the IP address has been configured correctly by requesting that the interface 40 supply (e.g., "show") its configured IP address to the process 52 thereafter Each of these actions is invoked, in actual implementation, via calling appropriate multi-step predefined functions (with appropriate arguments) by invocation of the names of these functions, with their arguments, stored in field 92 of tuple 76. Success or failure of performance of these functions is determined in a similar fashion to that used to determine success or failure of performance of those actions specified in field 92 of tuple 74, except that the expected reaction data contained in field 94 of tuple 76 is directed to expected successful reactions of interface 40 to the actions specified in field 92 of tuple 76, and that data is used to determine success or failure of the performance of the actions specified in field 92 of tuple 76. The repeated looping, etc. procedure described above in connection with tuple 74 in the event of a failure condition also proceeds in a substantially identical fashion in connection with processing of the instructions/data in tuple 76. As was described above in connection with tuple 74, setting of the undo flag 104 in tuple 76 causes, in the event of successful performance of the actions specified in field 92 of tuple 76, those actions to be pushed on the stack for later use in connection with unconfiguring the system 1 after testing is completed. Such successful performance also causes the index access variable to be set to eleven (as contained in field 100 of tuple 76), while failure of such performance (after the number of repeated attempts specified in field 96 of tuple 76 have been executed) causes the variable to be set to fifteen (as contained in field 102 of tuple 76). If the variable is set to fifteen, process 52 continues by processing the instructions/data of tuple 88 in the manner set forth above; otherwise, process 52 continues by processing the instructions/data contained in tuple 78.

If a success condition occurred in processing the instructions/data contained in tuple 76, the foregoing procedure used to process the instructions/data of tuple 74 is then substantially repeated using the instructions/data values contained in tuple 78. The actions specified in action field 92 of tuple 78 are directed to configuring (via appropriate commands and data issued by network 15) the IP address of router network interface 42 for use in testing the IP routing feature of router 16 via network 18, open (i.e., activate) that IP address, update the IP address routing information available to the router 16 (if necessary) and verify that the IP address has been configured correctly by requesting that the interface 42 supply (e.g., "show") its configured IP address to the process 52 thereafter. Each of these actions is invoked, in actual implementation, via calling appropriate multi-step predefined functions (with appropriate arguments) by invocation of the names of these functions, with their arguments, stored in field 92 of tuple 78. Success or failure of performance of these functions is determined in a similar fashion to that used to determine success or failure of performance of those actions specified in field 92 of tuple 74, except that the expected reaction data contained in field 94 of tuple 78 is directed to expected successful reactions of interface 42 to the actions specified in field 92 of tuple 76, and said data is used to determine success or failure of the performance of the actions specified in field 92 of tuple 78. The repeated looping, etc. procedure described above in connection with tuple 74 in event of failure condition also proceeds in a substantially identical fashion substantially in connection with processing of the instructions/data in tuple 78. As was described above in connection with tuple 74, setting of the undo flag 104 in tuple 78 causes, in the event of successful performance of the actions specified in field 92 of tuple 78, those actions to be pushed on the stack for later use in connection with unconfiguring the system 1 after testing is completed. Such successful performance also causes the index access variable to be set to eleven (as contained in field 100 of tuple 78), while failure of such performance (after the number of repeated attempts specified in field 96 of tuple 78 have been executed) causes the variable to be set to fifteen (as contained in field 102 of tuple 78). If the variable is set to fifteen, process 52 continues by processing the instructions/data of tuple 88 in the manner set forth above; otherwise, process 52 continues by processing the instructions/data contained in tuple 80.

If a success condition occurred in processing the instructions/data contained in tuple 78, the foregoing procedure used to process the instructions/data of tuple 74 is then substantially repeated using the instructions/data values contained in tuple 80. The actions specified in action field 92 of tuple 80 are directed to configuring (via appropriate commands and data issued by network 15) the IP address of endstation network interface 34 for use in testing the IP routing feature of router 16 via network 18, open (i.e., is activate) that IP address, update the IP address routing information available to the router 16 (if necessary) and verify that the IP address has been configured correctly by requesting that the interface 34 supply (e.g., "show") its configured IP address to the process 52 thereafter. Each of these actions is invoked, in actual implementation, via calling appropriate multi-step predefined functions (with appropriate arguments) by invocation of the names of these functions, with their arguments, stored in field 92 of tuple 80. Success or failure of performance of these functions is determined in a similar fashion to that used to determine success or failure of performance of those actions specified in field 92 of tuple 74, except that the expected reaction data contained in field 94 of tuple 80 is directed to expected successful reactions of interface 34 to the actions specified in field 92 of tuple 80, and said data is used to determine success or failure of the performance of the actions specified in field 92 of tuple 80. The repeated looping, etc. procedure described above in connection with tuple 74 in event of failure condition also proceeds in a substantially identical fashion substantially in connection with processing of the instructions/data in tuple 80. As was described above in connection with tuple 74, setting of the undo flag 104 in tuple 80 causes, in the event of successful performance of the actions specified in field 92 of tuple 80, those actions to be pushed on the stack for later use in connection with unconfiguring the system 1 after testing is completed. Such successful performance also causes the index access variable to be set to eleven (as contained in field 100 of tuple 80), while failure of such performance (after the number of repeated attempts specified in field 96 of tuple 80 have been executed) causes the variable to be set to fifteen (as contained in field 102 of tuple 80). If the variable is set to fifteen, process 52 continues by processing the instructions/data of tuple 88 in the manner set forth above; otherwise, process 52 continues by processing the instructions/data contained in tuple 82.

Actual stimulus/response testing of the router 16 begins via processing of the instructions/data contained in tuple 82. If a success condition occurred in processing the instructions/data of tuple 80, the process 52 executes the actions specified in action field 92 of tuple 82, which actions are for commanding the endstation 12 to "ping" the other endstation 20 via the networks 14, 18 and router 16. As is known to those skilled in the art, a "ping" essentially is a request issued by one station to another station for the other station to reply to the issuing station using a datagram that contains the same data that was sent in the issuing station's request (i.e., the other station echoes back to the issuing station the data contained in the issuing station's "ping" request). If the reply is not properly received by the issuing station within a predetermined time period, the ping is said to have failed, while if the ping reply is properly received within that time period, this indicates that the IP layers involved in the transmission to and from the pinged station are operating correctly.

More specifically, the actions specified in the field 92 of tuple 82 cause a ping request from endstation 12 to endstation 20 to be transmitted first from endstation 12 to router 16 via interface 30 and network 14. The request is then received at interface 40 of router 16. If the router 16 is functioning properly, the processor 28" determines based upon the destination IP address contained in the request (i.e., the IP address of interface 34 of endstation 20) and the IP routing database information (not shown) accessible by the router 16 by conventional means (not shown) that the request is to be forwarded to endstation 20, and routes the request from interface 40 through processor 28", interface 42 and network 18 to interface 34. When the request is received by the interface 34, processor 28' determines the nature of the request and forwards an appropriate reply to the interface 30 of endstation 12 using the reverse path that the request traversed to reach the endstation 20. Once again, if the router 16 is functioning properly the reply will be properly routed by the router 16 to the interface 30 of endstation 12.

After initiating the ping request to endstation 20, process 52 waits the predetermined amount of time for the reply to be received from endstation 20. If such a reply is received in the predetermined amount of time specified for same, the data contained in the reply is compared to that contained in the request, and if the two data sets match, the ping function returns to the process 52 a value indicating that the ping succeeded. It is this value indicative of success of the ping of the endstation 20 by the endstation 12 that is represented by the term "success" in field 94 of tuple 82 in FIG. 6. It is based upon comparison with this "success" value that the process 52 determines whether the performance of the action (i.e., the ping) specified in field 92 of tuple 82 was successful or not. If the ping is determined to be successful, the process 52 then checks the undo flag 104 of tuple 82 (which is not set), and then proceeds to set the index access value to that specified in success field 100 of tuple 82 (i.e., thirteen).

Otherwise, if the ping is determined not to be successful, the process 52 undertakes the attempt value decrementing, comparison, etc. looping procedure described previously in connection with tuple 74, and exits this looping procedure only when the repeatedly decremented attempt value equals zero or a success condition occurs. In the latter case, the processing then continues as set forth above for a success condition. In the former case, the process 52 sets the index access value to that specified in the failure 102 field of the tuple 82 (i.e., fifteen).

The process 52 then compares the newly set value of the index variable (i.e., thirteen in the event of a success condition, or fifteen in the event that the number of repeated failures specified in attempts field 96 of tuple 82 have occurred), to determine whether the newly set index variable has a value that is equal to one of the aforesaid three values indicative of immediate termination, and since the newly set value does not equal one of these termination values, the process 52 then proceeds to process the instructions/data contained in either tuple 84 (in the case of index value thirteen) or tuple 88 (in the case of index value fifteen).

Processing of tuple 84 begins by executing the actions specified in the action field 92 of tuple 84, which field specifies another ping operation. In this case, execution of the action specified in field 92 causes the process 52 to command the other endstation 20 via network 15 to issue a ping request to endstation 12, and to then forward the value returned by the ping function (i.e., indicative of either success or failure of the ping) to endstation 12 via network 15 for further processing by process 52. Determination of whether a success or failure condition exists is made substantially in accordance with the procedure used in processing tuple 82, except that in processing tuple 84, same is accomplished using the expected successful ping return value contained in field 94 which indicates that ping of the endstation 12 by endstation 20 was successful. Likewise, the repeated looping procedure used in event of failure condition in processing tuple 82 is also used in event of failure condition in processing tuple 84. Also, in processing tuple 84, if a success condition is determined to exist by the process 52, the further action to be accomplished will be the processing of tuple 86, as indicated by the index value fourteen specified in success field 100.

Access/execution of the data/instructions contained in tuple 86 essentially are the same as described above in connection with tuple 88, except that accessing/execution of the data/instructions of tuple 86 result in the process 52 returning a value indicating that testing of the router 16 was successful.

Figure 5:
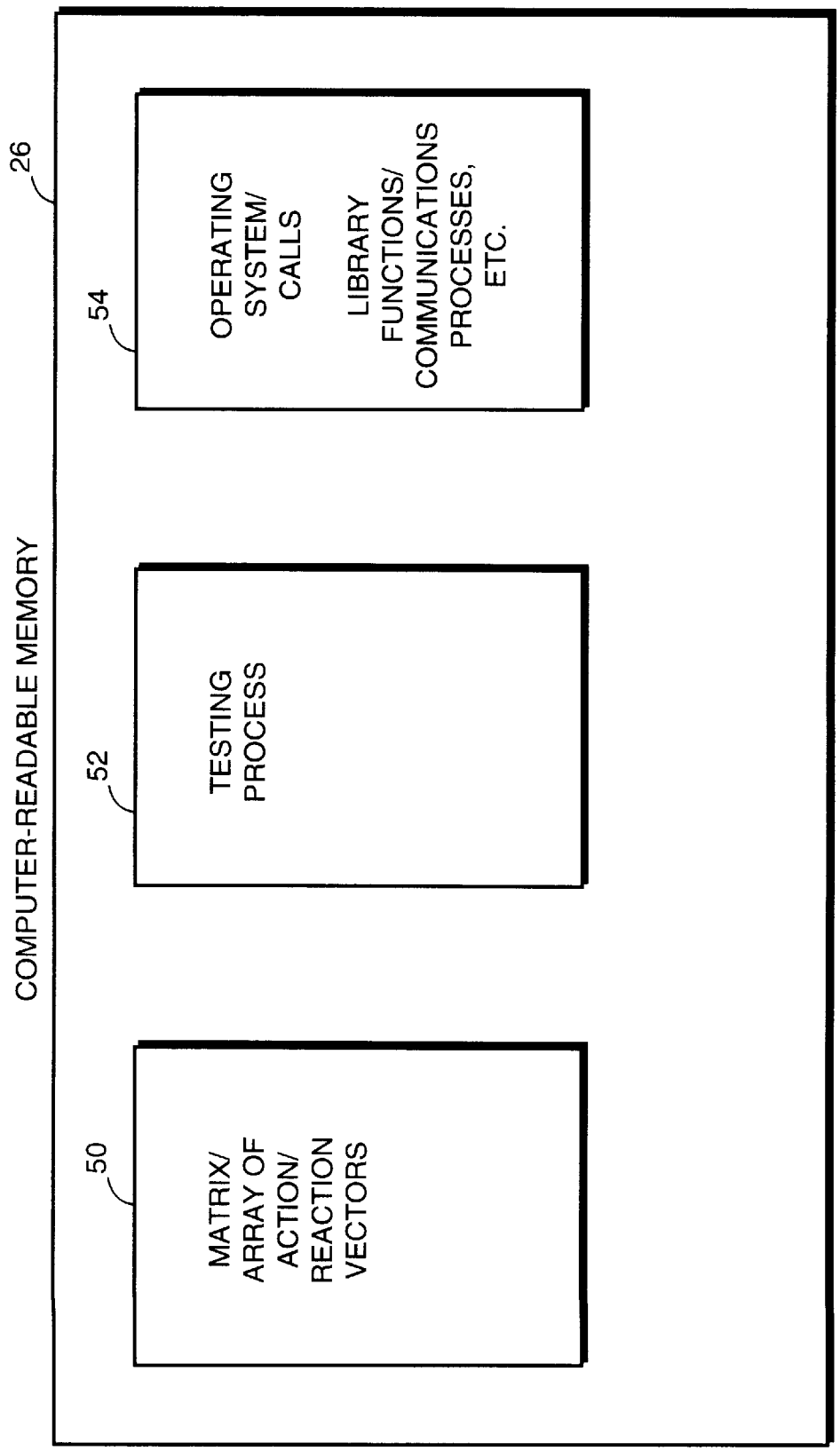
FIG. 5 is a schematic diagram illustrating contents of the computer-readable memory of the testing endstation in the testing arrangement of FIG. 1.

FIG. 7 illustrates program code/pseudocode statements 106 by which the contents of the matrix of FIG. 6 may be entered to the memory of FIG. 5 via use of the user interface 24 of the testing endstation 12. As shown in FIG. 7, the matrix 50 may be defined using a command for defining the matrix variable data structure (e.g., "set matrix" 108) followed by a set of braces or other characters for delimiting the contents of the matrix being defined. Each tuple of the matrix may be entered by specifying the index number of the tuple (e.g., "1" referred to by numeral 110) followed by a colon (:) or other delimiting character, and the contents of each of the entries (i.e., fields) of that tuple separated by respective colons or other delimiting characters. Alternatively, the contents of the matrix may be supplied and stored in the memory 26 in the form a "flat" file with spaces separating the respective entries.

Figure 8:
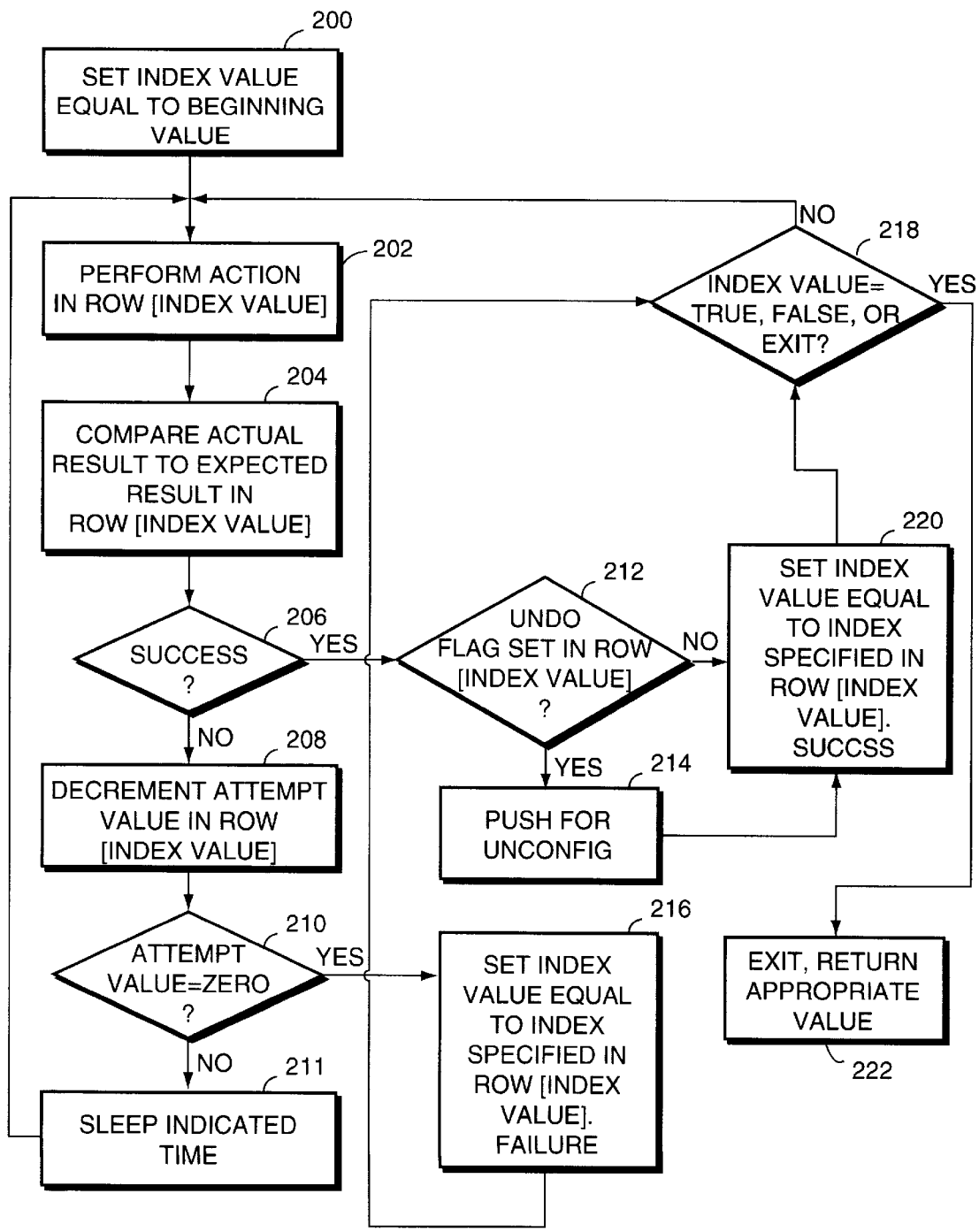
FIG. 8 is a flowchart illustrating the process flow of the generalized testing procedure used in the arrangement of FIG. 1.

Thus, abstracting away to some extent from the process flow of the specific embodiment described above, it can be seen that, in general, the process flow of process 52, when executed by processor 28, is as illustrated in FIG. 8. As shown at block 200 in FIG. 8, the process 52 begins by initializing the index value that it will use to access the tuples of the matrix 50 so as to cause the process 52 to begin accessing the matrix 50 at a desired beginning tuple thereof. In arrangement 1, and most implementations of the automation system of the present invention, this beginning tuple will be the first tuple (e.g., tuple 60 in matrix 50), however, it need not be (e.g., process 52 and matrix 50 may instead be modified such that the beginning tuple could be the tuple having the highest index value, and the various further actions specified in the matrix's success/failure fields could reference tuples having lower index values than the beginning tuple). Then, as shown at block 202, the process 52 continues by performing the action specified in the action field of the beginning tuple (i.e., the tuple having the index equal to the beginning index value). The actual results of performing this action are then compared (see block 204) with the expected results of such performance specified in the expected reaction field of the beginning tuple, and if the actual results match these expected results, a success condition is determined to exist with respect to the specified action, and the process 52 continues to block 212.

Otherwise, if a success condition is not deemed to be present at block 206, a failure condition is determined to exist with respect to the particular action carried out at block 202, and the process 52 goes on to decrement the value contained in the attempt field of the beginning tuple, as shown at block 208. After step 208, the process then determines whether the decremented value of the attempt field equals zero, and if not, the process loops backs to step 202 to perform again the action specified in the action field of the beginning tuple, after waiting the number of seconds specified in the sleep-time field associated with the action to be performed again (see block 211). The process 52 will continue looping through steps 202, 204, 206, 208, 210, and 211 until either a success condition is determined to exist at step 206 (in which case the process 52 branches to step 212, as stated previously) or a decremented attempt value equals zero (in which case the process 52 branches to step 216). At step 216, the process 52 sets the index value that it will use to access the tuples of the matrix 50 to be equal to that referred to in the failure field of the beginning tuple, and then proceeds to step 218.

After a success condition is determined to exist at step 206, the process 52 branches to step 212, where it is determined whether the undo field flag is set (i.e., equals one) in the beginning tuple. If so, the process 52 determines that the action specified in the beginning tuple is one that must be undone in order to unconfigure the arrangement 1 after testing has been completed, and pushes onto a stack (not shown) said action in order to permit undoing of same after completion of the testing. After this operation, or alternatively, if the flag was not set, the process 52 sets the index value that it will use to access the tuples of the matrix 50 so as to be equal to that referred to in the success field of the beginning tuple, and then proceeds to step 218.

At step 218, the process 52 determines whether the current index value that it will use to access the tuples of the matrix matches a preset "True," "False," or "Exit" data value for indicating that the process 52 should terminate immediately. If any of these data values matches the current index value, the process 52 proceeds to step 222 and terminates, returning the appropriate respective return value associated with that preset value (i.e., return a value indicative of successful testing if the current index value matches "True," a value indicative of unsuccessful testing if the current index value matches "False" or "Exit"). Otherwise, the process 52 proceeds to repeat the aforesaid procedures beginning at block 202 using the current index value (i.e., as set either at steps 216 or 220, depending upon whether a failure or a success condition, respectively, was determined to exist), instead of the beginning tuple index value, to access the next tuple of the array 50. The process thereafter may continue to repeat indefinitely using the aforesaid procedures, until the current index value is determined at step 218 to indicate that the process 52 should terminate, in which case said process does terminate.

Thus, it is evident that there has been provided, in accordance with the present invention, a computerized automation system and method that fully satisfy the aims and objectives, and achieve the advantages, set forth above. As will be apparent to those skilled in the art, many alternatively, modifications, and variations of the embodiments described above are possible. For example, although the present invention has been described above in connection with use in network test automation, it should be understood that the present invention may also be used in other types of computer automation applications (e.g., other testing and programming automation applications).

Additionally, although in test arrangement 1 each of the endstations and routers may comprise a SUN™ workstation running a Unix-based operating system and appropriate networking hardware and software for permitting the endstations and routers to operate in the manner aforedescribed, and the generic testing procedure may be written using a commercially-available Expect™-based computer language (pseudocode examples based upon same being used in FIGS. 6 and 7), it should be understood that if appropriately modified in ways apparent to those skilled in the art, other types of computer workstations, networking hardware and software, operating systems, and languages may be used without departing from the present invention.

For example, the endstations and router may instead comprise IBM-compatible personal computers (e.g., having Intel 80X86 central processing units) and may instead run an Internetwork Operating System-based operating system. Additionally, the testing process 52 of this embodiment of present invention, which was described above as running on the first endstation 12, may instead run on another SUN™ workstation (not shown), running a Unix-based operating system, which other workstation may have stored in memory thereof the matrix 50 and may be configured to transmit commands to and receive generated data from the system 1 appropriate for carrying out the aforedescribed testing, via e.g., telnet-based communications to the endstations and router.

Other modifications are also possible. For example, if modified ways apparent to those skilled in the art, the router 16 may comprise 25xx to 75xx systems commercially available from the Assignee of the subject application, or other types of routers, bridges, or switches. Accordingly, the present invention should be viewed quite broadly, as being limited only as set forth in the hereinafter appended claims.

What is claimed is:

1. A computerized automation system, comprising:
a. a memory for storing an array including a plurality of tuples, each said tuple including a respective action field, a respective reaction field, a respective success field, and a respective failure field, wherein in each said tuple, said respective action field is for specifying at least one respective action whose performance by another system is to be commanded by said automation system, said respective reaction field is for specifying at least one respective expected result to be achieved by performance of said respective action by said another system, said respective success field is for specifying further action to be executed by said automation system if said respective expected result is achieved, and said failure field is for specifying other action to be executed by said automation system if said respective expected result is not achieved; and
b. a processor for generating a command to said another system to perform the action specified by the action field of a beginning tuple of said array, for receiving an indication of an actual result of execution of said command by said another system, and for comparing said actual result to the expected result specified in the reaction field of said beginning tuple so as to determine whether the expected result specified in the reaction field of said beginning tuple has been achieved by said execution, said processor being configured to command said automation system to execute the further action specified in the success field of said beginning tuple if said execution has achieved the expected result specified in said reaction field of the beginning tuple and also to command said automation system to execute the other action specified in the failure field of said beginning tuple if said execution has not achieved the expected result specified in the reaction field of said beginning tuple,
the processor also being for causing the array to be stored in the memory based upon user input of respective values to be contained in the respective fields of the array, input of the respective values being via a user interface and being initiated by user input of an array defining command followed by a set of characters that delimit contents of the array, the values being input via the user interface by specifying, for each respective tuple, a respective index number of the respective tuple followed by the respective values to be contained in the respective fields in the respective tuple, and with the values being delimited from each other by value delimiting characters.

2. The automation system according to claim 1, wherein said beginning tuple also includes another field, and said processor is configured to repeat generation of said command until one of achievement of the expected result specified in said reaction field of the beginning tuple and number of times of said generation of said command equals an integer contained in said another field.

3. The automation system according to claim 1, wherein said success field of said beginning tuple of said array includes an index number of another tuple of said array, and said processor is configured to generate, as the further action specified by the success field of the beginning tuple if said execution has achieved the expected result specified in the reaction field of the beginning tuple, another command to said another system to perform the action specified by the action field of the another tuple of said array.

4. The automation system according to claim 1, wherein said failure field of said beginning tuple of said array includes an address of a beginning instruction of a program routine stored in said memory to be executed by said processor as said other action if said execution has not achieved the expected result specified in the reaction field of said beginning tuple, said program routine being for providing a user-appreciable warning that said execution has not achieved the expected result specified in the reaction field of the beginning tuple.

5. The automation system according to claim 1, wherein said beginning tuple also includes two other fields, and said processor is configured both to repeat generation of said command until one of achievement of the expected result specified in said reaction field of the beginning tuple and number of times of said generation of said command equals an integer contained in one of said two other fields and to wait between each two respective generations of said command a period of time specified in the other of said two other fields prior to generating said command again.

6. The automation system according to claim 1, wherein said another system comprises a system-under-test, and said automation system is for testing operation of said system-under-test.

7. The automation system according to claim 1, wherein at least one of said respective action fields includes a function whose instructions are stored in said memory for being executed by said processor whereby to command said another system to execute a desired action associated with said function.

8. A computerized automation method implemented using an automation system having memory and a processor, comprising:
   a. storing in said memory an array having a plurality of respective tuples, each tuple including a respective action field, a respective reaction field, a respective success field, and a respective failure field, wherein in each said tuple, said respective action field is for specifying at least one respective action whose performance by another system is to be commanded by said automation system, said respective reaction field is for specifying at least one respective expected result to be achieved by performance of said respective action by said another system, said respective success field is for specifying further action to be executed by said automation system if said respective expected result is achieved, and said failure field is for specifying other action to be executed by said automation system if said respective expected result is not achieved; and
   b. executing a computer process using said processor, said process generating a command to said another system to perform the action specified by the action field of a beginning tuple of said array, receiving an indication of an actual result of execution of said command by said another system, and comparing said actual result to the expected result specified in the reaction field of said beginning tuple so as to determine whether the expected result specified in the reaction field of said beginning tuple has been achieved by said execution, said processor being configured to command said automation system to execute the further action specified in the success field of said beginning tuple if said execution has achieved the expected result specified in said reaction field of the beginning tuple and also to command said automation system to execute the other action specified in the failure field of said beginning tuple if said execution has not achieved the expected result specified in the reaction field of said beginning tuple;
   wherein storage of the array in the memory is based upon user input of respective values to be contained in the respective fields of the array, input of the respective values being via a user interface by specifying for each respective tuple, a respective index number of the respective tuple followed by the respective values to be contained in the respective fields, in the respective tuple, the values being delimited from each other by value delimiting characters.

9. The method according to claim 8, wherein at least one of the actions specified in said action fields is input via said interface to one of said action fields as a multi-step script.

10. The method according to claim 8, further comprising, storing in said memory at least one predefined function to be executed by said processor, and storing in at least one field of said array a call to said function.

11. A method for testing a first system using a second system, said second system including memory and a processor and being configured to receive inputs from and transmit outputs to, respectively, said first system, said method comprising:
   a. storing in said memory an array containing a plurality of action/reaction vectors, each of said plurality of vectors having a respective index number and including respective first and second data, each said respective first data being for use in generating a respective test output to be generated by said second system and supplied to said first system, each said respective second data being for indicating a respective expected input to be generated from said first system in response to supply of said respective test output thereto from said second system; and
   b. using said processor to execute a computer process that tests said first system based upon said action/reaction vectors, said inputs and said outputs, said process being configured to access an initial vector of said array and to generate a first output corresponding to the respective test output, said first output being supplied to said first system whereby to cause said first system to generate a first input to said second system in response thereto, said process also being configured to execute further program instructions indicated by other data in said initial vector based upon whether said first input conforms to the expected input indicated by the second data in said initial vector, the processor also causing the array to be stored in the memory based upon user input of respective values of the respective data of the vectors, input of the respective values being via a user interface by specifying, for each respective vector, the respective index number of the respective vector followed by the respective values of the respective data in the respective vector, the values being delimited from each other by value delimiting characters.

12. The method according to claim 11, wherein said further instructions indicated by said other data are for causing said processor to generate a second output for supply to said first system using respective first data contained in another action/reaction vector whose index number is referenced by said other data, and for causing said processor to execute other instructions indicated by respective other data in said another action/reaction vector based upon whether a second input from said first system conforms to an expected input indicated by respective second data in said another action/reaction vector.

13. The method according to claim 11, wherein said other data is for indicating first program instructions for being executed by said processor if said first input conforms to the expected input indicated by the second data in said initial vector, and also for indicating second program instructions for being executed by said processor if said first input does not conform to the expected input indicated by the second data in said initial vector.

14. The method according to claim 11, wherein said first data of said initial action/reaction vector is a function to be executed by said processor to generate said first output.

15. A data structure stored in computer-readable memory and for being accessed by a process running on a computer, said structure comprising:

an array of action/reaction vectors, each said vector including at least one respective action whose execution is expected to yield a respective expected reaction, said process executing a comparison between a respective actual result of said execution and said respective expected reaction, and based upon said comparison, said process executing one of a plurality of further actions also comprised in the vector including said at least one respective action, wherein the array as stored in the memory comprises a plurality of values initially input to the computer via a user interface, the values specifying the respective actions and reactions, the values being input via the user interface by specifying, for each respective vector, a respective index number of the respective vector followed by respective values associated with the respective vector, the respective values being delimited from each other by value delimiting characters.

16. The data structure according to claim 15, wherein said plurality of further actions includes respective further actions indicative of success and failure of said execution to achieve said respective expected reaction.

17. The data structure according to claim 16, wherein said plurality of further actions includes another action specified in another respective action/reaction vector of said array.

* * * * *